(12) United States Patent
Robertsson et al.

(10) Patent No.: US 7,319,636 B2
(45) Date of Patent: Jan. 15, 2008

(54) CALIBRATION OF PRESSURE GRADIENT RECORDINGS

(75) Inventors: Johan O. A. Robertsson, Oslo (NO); Nicolas Goujon, Oslo (NO)

(73) Assignee: WesternGeco, L.L.C., Houston, TX (US)

( * ) Notice: Subject to any disclaimer, the term of this patent is extended or adjusted under 35 U.S.C. 154(b) by 18 days.

(21) Appl. No.: 11/079,704

(22) Filed: Mar. 14, 2005

(65) Prior Publication Data

US 2006/0203611 A1     Sep. 14, 2006

(51) Int. Cl.
*G01V 1/38* (2006.01)
*G01V 1/28* (2006.01)

(52) U.S. Cl. .................. 367/21; 367/15; 367/20; 367/24

(58) Field of Classification Search .......... 367/19, 367/21, 24, 20, 15
See application file for complete search history.

(56) References Cited

U.S. PATENT DOCUMENTS

| | | | | |
|---|---|---|---|---|
| 2,757,356 | A * | 7/1956 | Haggerty | 367/24 |
| 3,286,224 | A * | 11/1966 | Zefting | 367/125 |
| 4,437,175 | A | 3/1984 | Berni | |
| 4,520,467 | A | 5/1985 | Berni | |
| 4,692,907 | A * | 9/1987 | Jubinski | 367/20 |
| 4,752,916 | A * | 6/1988 | Loewenthal | 367/24 |
| 4,935,903 | A | 6/1990 | Sanders et al. | |
| 4,979,150 | A * | 12/1990 | Barr | 367/24 |
| 5,051,961 | A * | 9/1991 | Corrigan et al. | 367/24 |
| 5,365,492 | A * | 11/1994 | Dragoset, Jr. | 367/21 |
| 5,581,514 | A * | 12/1996 | Moldoveanu et al. | 367/16 |
| 6,041,127 | A * | 3/2000 | Elko | 381/92 |
| 6,101,448 | A * | 8/2000 | Ikelle et al. | 702/17 |
| 6,477,470 | B2 * | 11/2002 | Fokkema et al. | 702/17 |
| 6,654,694 | B2 * | 11/2003 | Fokkema et al. | 702/18 |
| 6,747,913 | B2 * | 6/2004 | Fokkema et al. | 367/24 |
| 6,775,618 | B1 | 8/2004 | Robertsson et al. | |
| 2005/0013194 | A1 | 1/2005 | Vaage et al. | |
| 2005/0195686 | A1 | 9/2005 | Vaage et al. | |
| 2005/0265122 | A1 * | 12/2005 | Grion | 367/21 |

FOREIGN PATENT DOCUMENTS

EP          89700 A2      9/1983

(Continued)

OTHER PUBLICATIONS

Gordienko, et al. "Possibilities of Pressure-Gradient Sensors Based on Hydrophones Dispersed in Space." 1988 Plenum Publishing Corporation.*

(Continued)

*Primary Examiner*—Mark Hellner
*Assistant Examiner*—Scott A Hughes
(74) *Attorney, Agent, or Firm*—Ari Pramudji; Liangang (Mark) Ye; Jeffrey E. Griffin

(57) ABSTRACT

A method for computing a pressure signal gradient. The method includes recording a plurality of pressure signals at least one of a first receiver and a second receiver. The first receiver and the second receiver are disposed within a cluster. The method further includes recording a plurality of pressure signals at the second receiver; computing a calibration filter for removing the difference in distortions between the pressure signals recorded at the first receiver and the pressure signals recorded at the second receiver; and computing the pressure signal gradient between the pressure signals recorded at the first receiver and the pressure signals recorded at the second receiver using the calibration filter.

5 Claims, 5 Drawing Sheets

FOREIGN PATENT DOCUMENTS

| WO | WO0057207 | * | 9/2000 |
|----|-----------|---|--------|
| WO | WO 03/058276 A1 | | 7/2003 |
| WO | WO 03058276 A2 | | 7/2003 |
| WO | WO 2004/029662 A1 | | 4/2004 |
| WO | WO 2004029662 A1 | | 4/2004 |

OTHER PUBLICATIONS

Wikipedia, "Pressure Gradient".*

Becker, et al. "The ONR Five Octave Research Array (FORA) at Penn State." OCEANS 2003, Proceedings, Sep. 2003.*

Muijs, R., Robertsson, J.O.A., and Holliger, Klaus; *Data-Driven Adaptive Decomposition of Multicomponent Seabed Recordings*, GEOPHYSICS, vol. 69, No. 5 (Sep.-Oct. 2004); p. 1329-1337.

Stroemmen-Melboe, A.H., Robertsson, J.O.A., and Van Manen, D.J.; *PZ calibration by applying the equation of motion to critically refracted waves*, 72$^{nd}$ Annual Society of Exploration of Geophysicists (SEG) Meeting, Salt Lake City, 2002.

Schalkwijk, K., 2003, *Adaptive decomposition of multicomponent ocean-bottom seismic data into downgoing and upgoing P- and S-wave*: GEOPHYSICS, vol. 68, No. 3 (May-Jun. 2003); p. 1091-1102.

Aslaug H. S. Melbø, Johan O. A. Robertsson* and Dirk-Jan van Manen, WesternGeco, Oslo, Norway, PZ calibration by applying the equation of motion to critically refracted waves.

Remco Muijs_and Klaus Holliger, Swiss Federal Institute of Technology Johan Robertsson, Schlumberger, Data-driven adaptive decomposition of multicomponent seabed recordings.

Schalkwijk, Thesis, pp. 41-43.

* cited by examiner

CALIBRATION OF PRESSURE GRADIENT RECORDINGS

BACKGROUND OF THE INVENTION

1. Field of the Invention

Embodiments of the present invention generally relate to seismic data processing, and more particularly to a method for computing a pressure signal gradient.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, though, motion sensors, such as accelerometers may be used. Both the sources and receivers may be strategically repositioned to cover the survey area.

Streamers of seismic receivers are often used in marine seismic surveying. The streamers typically contain hydrophones for recording pressure fluctuations caused by the seismic waves propagating in the water. Recently, it has been realized that the value of seismic data would be substantially enhanced if the particle motion vector of the seismic waves propagating in the water could be recorded. Some seismic streamers have included geophones or accelerometers for recording particle velocity or acceleration; however, such configurations have proven to be difficult due to noise and mechanical vibrations in the streamers.

However, according to Newton's Equation of Motion, particle acceleration is equivalent to pressure gradient. As such, pressure gradient may be recorded or estimated, as opposed to particle velocity or acceleration. Pressure gradient may be recorded or estimated using closely spaced multiple streamers, such as over/under configurations. Unfortunately, such methods are often operationally complex and costly. Consequently, it has recently been proposed to use multiple hydrophones spaced closely apart within one streamer. One of the challenges encountered in using such streamers involves keeping the diameter of the streamers to a minimal to avoid negative consequences, such as drag and the like. Consequently, this requirement limits the amount of distance that can be placed between the receivers on the streamers in a pressure gradient configuration. It has been observed that the shorter the distance between the receivers, the lesser the amount of low frequencies that can be recovered.

One of the problems of placing the receivers in close proximity to each other is the increase in noise behind the signal in pressure gradient estimate. As the distance between the receivers decreases, the signal strength of the difference between the pressure signals of the receivers also decreases. (See FIG. 1). This decrease in signal strength often leads to unreliable pressure gradient measurements.

Therefore, a need exists in the art for an improved method for computing the pressure signal gradient that will overcome the above referenced problems.

SUMMARY OF THE INVENTION

Various embodiments of the present invention are generally directed to a method for computing a pressure signal gradient. The method includes recording a plurality of pressure signals at least one of a first receiver and a second receiver. The first receiver and the second receiver are disposed within a cluster. The method further includes recording a plurality of pressure signals at the second receiver; computing a calibration filter for removing the difference in distortions between the pressure signals recorded at the first receiver and the pressure signals recorded at the second receiver; and computing the pressure signal gradient between the pressure signals recorded at the first receiver and the pressure signals recorded at the second receiver using the calibration filter.

In one embodiment, the first and second receivers are disposed vertically above one another.

In another embodiment, the calibration filter is computed according to $$\varphi(k_x, \omega) = -\frac{1}{2\rho\omega}\left(\left(\frac{1}{i\Delta z} + k_z\right)\tilde{P}_1 + \frac{1}{i\Delta z}G(\omega)\tilde{P}_2\right),$$

where $G(\omega)$ represents the calibration filter, $\phi(k_x, \omega)$ represents a cost function, $\rho$ represents the density of water, $\omega$ represents the angular frequency, $\tilde{P}_1$ represents the recorded pressure signals at the first receiver, $\tilde{P}_2$ represents the recorded pressure signals at the second receiver, $\Delta z$ represents a vertical distance separating the first receiver from the second receiver, and $k_z$ represents an absolute value of a vertical wave number. The cost function $\phi(k_x, \omega)$ is derived such that the space-time data window to which it is applied contains only up-going waves. As such, the calibration filter may be determined by minimizing the cost function $\phi(k_x, \omega)$ in a space-time data window containing only up-going waves.

In yet another embodiment, the pressure signal gradient is computed according to $\partial_z P = (\tilde{P}_1 - G(\omega)\tilde{P}_2)/\Delta z$, where $\partial_z P$ represents a z-component of the pressure signal gradient, $\tilde{P}_1$ represents the pressure signals recorded at the first receiver, $G(\omega)$ represents a calibration filter, $\overset{\square}{P_2}$ represents the pressure signals recorded at the second receiver and $\Delta z$ represents a vertical distance between the first receiver and the second receiver.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
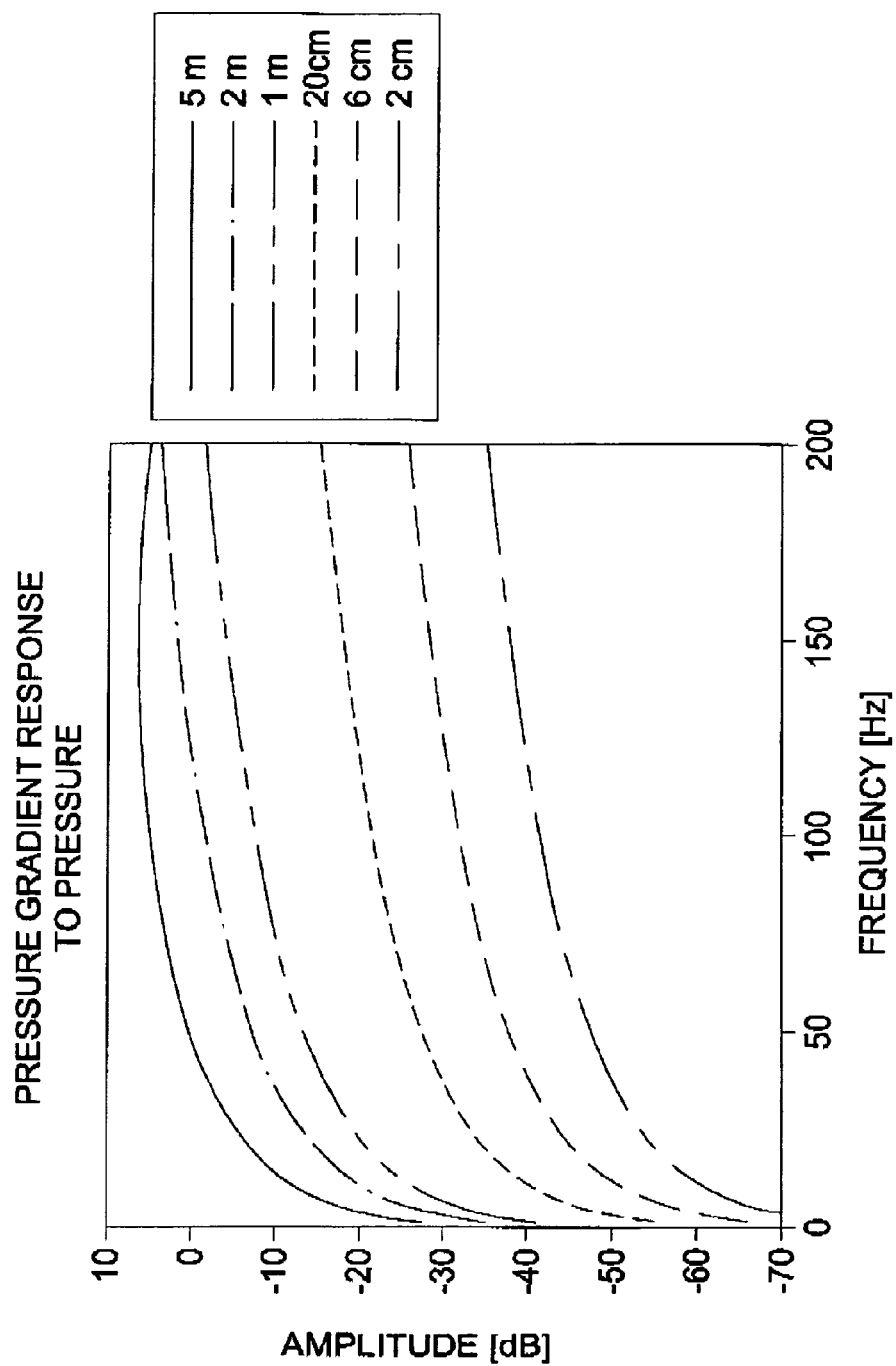
FIG. 1 illustrates a graphical depiction of the decrease in signal strength of the difference between the pressure signals of the receivers as the distance between the receivers decreases.
Figure 2:
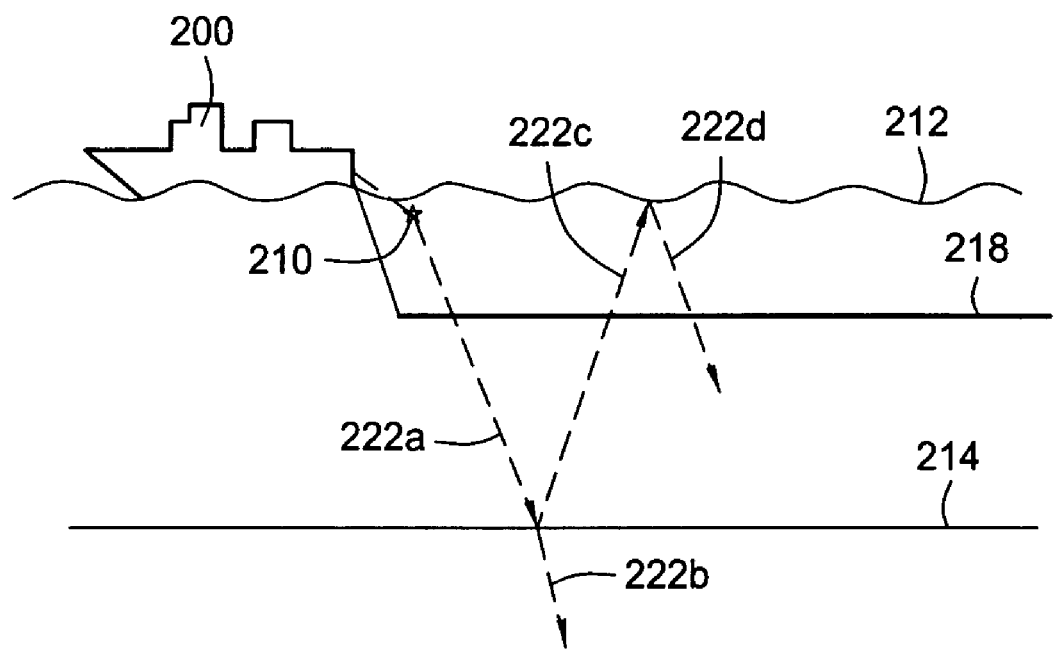
FIG. 2 illustrates a seismic vessel towing a seismic source and a seismic streamer that may be used in connection with one or more embodiments of the invention.

FIG. 2 illustrates a seismic vessel 200 towing a seismic source 210 and a seismic streamer 218 that may be used in connection with one or more embodiments of the invention. The seismic streamer 218 may be placed at about 60 meters below sea surface 212. However, those skilled in the art will recognize that the seismic streamer 218 may be placed at much shallower depth, such as 3 to 4 meters below the sea surface 212, or at depths greater than 60 meters below the sea surface 212. The dashed arrows 222a-d illustrate paths of seismic energy from the seismic source 210. Arrow 222a illustrates the initial down-going seismic energy. Arrow 222b illustrates a portion of the seismic energy that is transmitted through the sea floor 214. Arrow 222c illustrates an up-going reflection of seismic energy. Arrow 222d illustrates a down-going ghost reflected from the sea surface 212.

Figure 3:
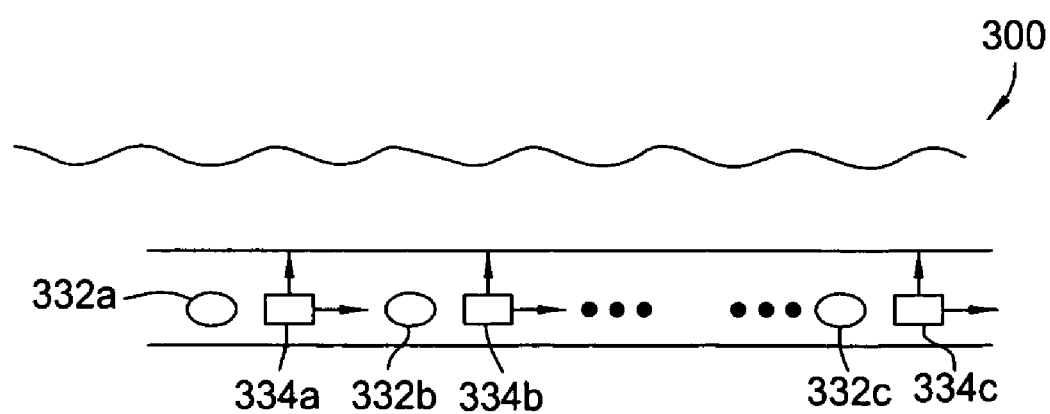
FIG. 3 illustrates a streamer configuration that may be used in connection with one or more embodiments of the invention.

FIG. 3 illustrates a streamer configuration 300 that may be used in connection with one or more embodiments of the invention. The streamer configuration 300 includes a streamer 330, which includes multiple hydrophones 332a, 332b, 332c and multiple pressure signal gradient measuring devices 334a, 334b and 334c. The hydrophones 332a, 332b, 332c are separated by a distance of less than about 12 meters. The pressure signal gradient measuring devices 334a, 334b and 334c are also separated by a distance of less than about 12 meters. Each pressure signal gradient measuring device 334 may be a cluster of hydrophones that includes two hydrophones that are vertically disposed one above the other. In such an embodiment, the two hydrophones may be perfectly aligned above each other. In another embodiment, each pressure signal gradient measuring device 334 may be a cluster of hydrophones having three hydrophones disposed at the corners of a triangle configuration. In yet another embodiment, each pressure signal gradient measuring device 334 may be a cluster of hydrophones having four hydrophones disposed at the corners of a tetrahedron configuration. The streamer 330 may also include inclinometers (not shown) for measuring the orientation of the hydrophones disposed in the triangle or tetrahedron configurations. One advantage of using hydrophone clusters disposed in the triangle or tetrahedron configurations is the ability to recover vertical pressure signal gradients as well as the horizontal pressure signal gradients.

Figure 4:
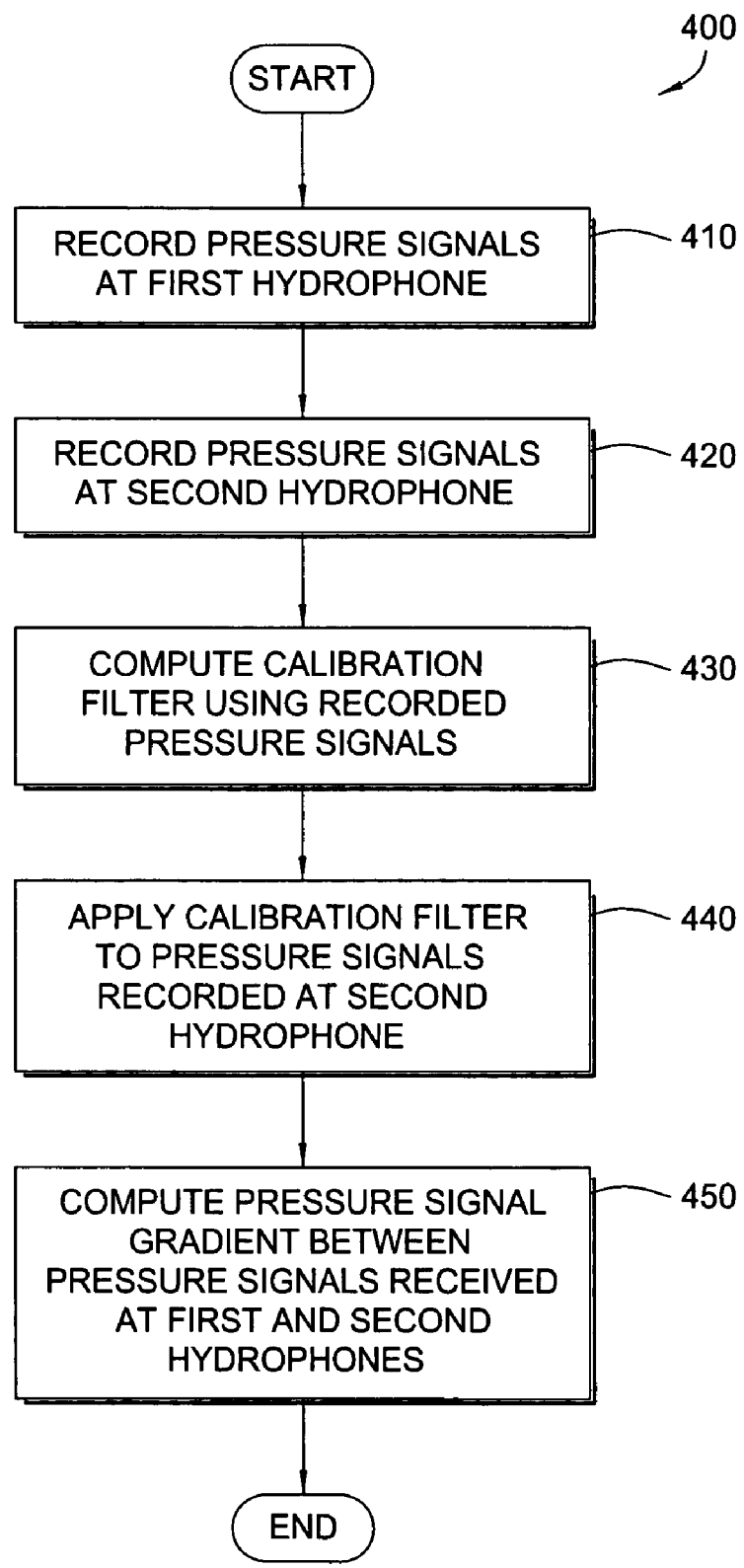
FIG. 4 illustrates a flow diagram of a method for computing an estimate of pressure signal gradient in accordance with one or more embodiments of the invention.

FIG. 4 illustrates a flow diagram of a method 400 for computing an estimate of a pressure signal gradient in accordance with one or more embodiments of the invention. At step 410, pressure signals are recorded at a first hydrophone within a cluster of hydrophones having two hydrophones vertically disposed one above the other. At step 420, pressure signals are recorded at a second hydrophone within the same cluster. In this manner, the pressure signals are recorded at the first hydrophone separately from the pressure signals recorded at the second hydrophone. The recordings at steps 410 and 420 may be performed prior to, during or after a survey. One advantage of recording the pressure signals before or during a survey includes the ability to visualize or conduct a quality control on the pressure signal gradient measurements during the survey. The first hydrophone and the second hydrophone are vertically separated by a distance $\Delta z$, which may be in a range from about 1.5 cm to about 15 cm.

At step 430, a calibration filter is computed using the recorded pressure signals. In one embodiment, the calibration filter may be computed using the following equation:

$$\varphi(k_x, \omega) = -\frac{1}{2\rho\omega}\left(\left(\frac{1}{i\Delta z} + k_z\right)\overset{\square}{P_1} + \frac{1}{i\Delta z}G(\omega)\overset{\square}{P_2}\right), \quad \text{Equation (1)}$$

where $G(\omega)$ represents the calibration filter, $\phi(k_x, \omega)$ represents the cost function, $\rho$ represents the density of water, $\omega$ represents the angular frequency, z,1 represents recorded pressure signals at the first hydrophone, $\overset{\square}{P_2}$ represents recorded pressure signals at the second hydrophone, $\Delta z$ represents the vertical distance separating the first hydrophone from the second hydrophone, $k_z$ represents the absolute value of the vertical wave number, which can be expressed in terms of frequency and horizontal wave numbers using the dispersion relation in water ($k_z = \sqrt{((\omega/c)^2 - k_x^2 - k_y^2}$, where c is the acoustic velocity in water). The cost function $\phi(k_x, \omega)$ is derived such that the space-time data window to which it is applied contains only up-going waves. As such, the calibration filter $G(\omega)$ may therefore be determined by minimizing the cost function $\phi(k_x, \omega)$ in a space-time data window that contains only up-going waves. In other words, the calibration filter $G(\omega)$ may be determined by minimizing the cost function $\phi(k_x, \omega)$ as a function of angular frequency. In this manner, the calibration filter is frequency dependent. Furthermore, in this embodiment, only inline propagation has been assumed and dependency on $k_y$ has been ignored. Although an embodiment of the invention is described with reference to computing the calibration filter using Equation (1), other embodiments of the invention contemplate other methods and equations for computing the calibration filter.

Equation (1) may be derived from the up-going and down-going portions of the vertical component of particle velocity $V_z$. The up-going portion of the vertical component of particle velocity $V_z$ is described as follows:

$$V_z^U = \frac{1}{2}\left(V_z - \frac{k_z}{\rho\omega}P\right), \qquad \text{Equation (2)}$$

where $V_z$ represents the vertical component of particle velocity, $V_z^U$ represents the up-going portion of the vertical component of particle velocity, $\rho$ represents the density of water, $\omega$ represents the angular frequency, P represents pressure, and $k_z$ represents the absolute value of the vertical wave number.

The down-going portion of the vertical component of particle velocity $V_z$ is described as follows:

$$V_z^D = \frac{1}{2}\left(V_z + \frac{k_z}{\rho\omega}P\right). \qquad \text{Equation (3),}$$

where $V_z$ represents the vertical component of particle velocity, $V_z^D$ represents the down-going portion of the vertical component of particle velocity, $\rho$ represents the density of water, $\omega$ represents the angular frequency, P represents pressure, and $k_z = \sqrt{((\omega/c)^2 - k_x^2 - k_y^2)}$ where $k_z$ represents the absolute value of the vertical wave number.

The vertical component of particle velocity $V_z$ may be represented as:

$$V_z = -\frac{1}{i\omega\rho}\partial_z P, \qquad \text{Equation (4)}$$

where $\rho$ represents the density of water, $\omega$ represents the angular frequency, P represents pressure and $\partial_z P$ represents the vertical component of the pressure signal gradient.

The pressure field at the first hydrophone $P_1$ may be expressed as:

$$P_1 = F_1(\omega)\overset{\square}{P}_1 \qquad \text{Equation (5),}$$

where $\overset{\square}{P}_1$ represents recorded pressure signals at the first hydrophone. Similarly, the pressure at the second hydrophone $P_2$ may be expressed as:

$$P_2 = F_2(\omega)\overset{\square}{P}_2 \qquad \text{Equation (6),}$$

where $\overset{\square}{P}_2$ represents recorded pressure signals at the second hydrophone. Both $F_1(\omega)$ and $F_2(\omega)$ represent filters that are functions of frequency with a value of substantially equal to one for a substantial portion of the frequency band of interest.

For a wave front decomposed into plane waves, Equation (3) may be rewritten using Equations (4) to (6) and yield:

$$V_z^D \approx \frac{1}{2}\left(-\frac{1}{i\omega\rho}\frac{P_1 - P_2}{\Delta z} + \frac{k_z}{\rho\omega}\frac{P_1 + P_2}{2}\right) \qquad \text{Equation (7)}$$

$$= \frac{1}{2}\left(\frac{1}{i\omega\rho}\frac{F_1\overset{\square}{P}_1 - F_2\overset{\square}{P}_2}{\Delta z} + \frac{k_z}{\rho\omega}\frac{F_1\overset{\square}{P}_1 + F_2\overset{\square}{P}_2}{2}\right).$$

Since $P_1 \approx P_2$ and since $\Delta z$ is very small, e.g., in a range from about 1.5 cm to about 15 cm, Equation (7) can be rewritten as:

$$V_z^D \approx \frac{1}{2}\left(-\frac{1}{i\omega\rho}\frac{F_1\overset{\square}{P}_1 - F_2\overset{\square}{P}_2}{\Delta z} + \frac{k_z}{\rho\omega}F_1\overset{\square}{P}_1\right) \qquad \text{Equation (8)}$$

$$= -\frac{1}{2\rho\omega}F_1\left(\left(\frac{1}{i\Delta z} + k_z\right)\overset{\square}{P}_1 + \frac{1}{i\Delta z}G\overset{\square}{P}_2\right).$$

It can be seen from Equation (8) that the calibration problem for two closely spaced hydrophones may be solved by first determining a frequency dependent filter $G(\omega)$ in a space-time data window containing only up-going waves.

Referring back to FIG. 4, once the calibration filter is computed, the calibration filter is applied to the pressure signals recorded at the second hydrophone (step 440). The calibration filter may be applied by convolution, if the operation is performed in the time domain. Alternatively, the calibration filter may be applied by multiplication, if the operation is performed in the frequency domain. In this manner, the difference in distortions of the recorded pressure signals is removed so that the resulting pressure signals at both first and second hydrophones would have identical distortions. That is, the pressure signals recorded at both first and second hydrophones would have substantially identical characteristics. In one embodiment, the calibration filter may be applied to the pressure signals recorded at the second hydrophone during the survey before computing the pressure signal gradient.

At step 450, the pressure signal gradient between the pressure signals recorded at the first and second hydrophones is computed. In one embodiment, the z component of the pressure signal gradient is computed according to:

$$\partial_z P = (\overset{\square}{P}_1 - G(\omega)\overset{\square}{P}_2)/\Delta z \qquad \text{Equation (9),}$$

where $\partial_z P$ represents the z component of the pressure signal gradient, $\overset{\square}{P}_1$ represents recorded pressure signals at the first hydrophone, $\overset{\square}{P}_2$ represents recorded pressure signals at the second hydrophone and $\Delta z$ represents the vertical distance between the first hydrophone and the second hydrophone.

The x and y components of the pressure signal gradient may also be computed using the various above referenced methods used to compute the z component of the pressure signal gradient. Further, in order to calibrate the cross-line pressure signal gradient, the streamer may be rotated in the water and the calibration procedure may be repeated so that all components of the pressure signal gradient can be accurately calibrated. Once it has been calibrated properly in the vertical direction, the pressure signal gradient configuration is equally well suited for recording vertical as well as cross-line pressure signal gradient.

In one embodiment, once the pressure signal gradient has been computed, the pressure signal gradient may be used in conventional seismic data processing, including deghosting, removing multiples and imaging. In another embodiment, method 400 may be repeated for each pressure gradient configuration in the streamer. In yet another embodiment, method 400 may be repeated for each pressure gradient configuration in the common receiver domain or in the common shot domain by using compact space filters that act on the recorded pressure signals as described in commonly assigned WO 2004/029662, which is incorporated herein by reference. Although the method for computing an estimate of a pressure signal gradient is described with reference to a cluster of hydrophones having two hydrophones, other embodiments of the invention contemplate methods for computing pressure signal gradient estimates for a cluster of hydrophones having more than two hydrophones, such as, three or four hydrophones. Further, although embodiments of the invention are described with reference to a single streamer configuration, such as streamer 330, other embodiments of the invention may also be applied to multiple streamer configurations, such as over/under streamer configurations. Further, although embodiments of the invention are described herein with reference to hydrophones, other embodiments contemplate other types of receivers commonly known by persons of ordinary skill in the art. Further, various embodiments of the invention discussed herein may be applied to seismic data acquired in a seabed seismic setting, a borehole seismic setting or an over/under seismic setting.

Figure 5:
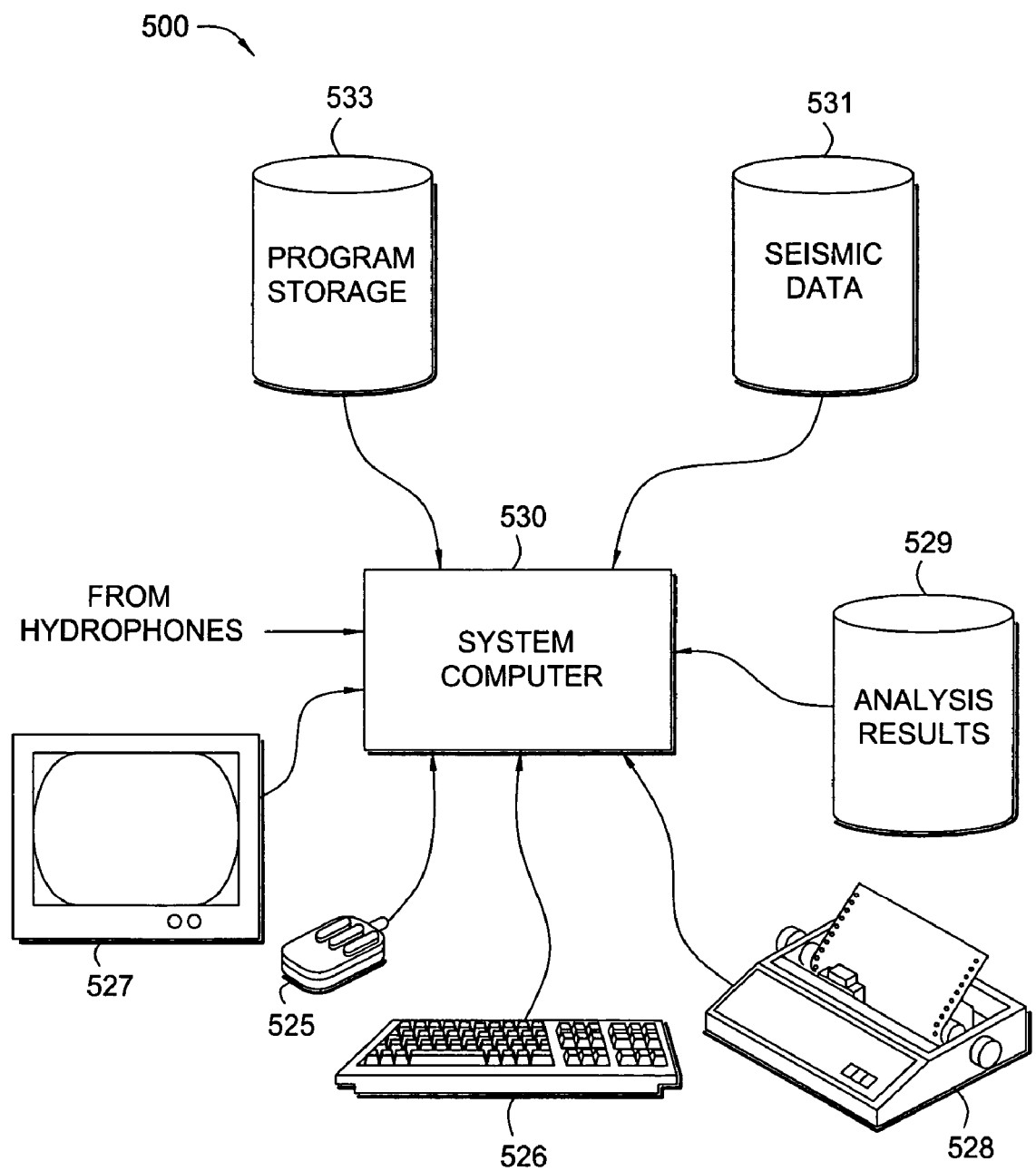
FIG. 5 illustrates a computer network, into which embodiments of the invention may be implemented.
Figure 6A:
FIGS. 6A-6C illustrate various configurations of a pressure signal gradient measuring device in accordance with various implementations described herein.
Figure 6B:
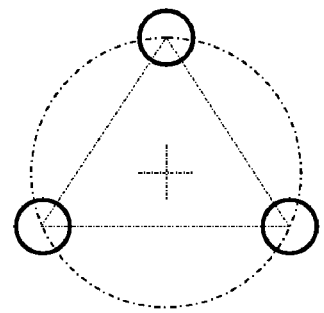
Figure 6C:
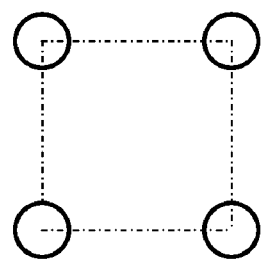

FIG. 5 illustrates a computer network 500, into which embodiments of the invention may be implemented. The computer network 500 includes a system computer 530, which may be implemented as any conventional personal computer or workstation, such as a UNIX-based workstation. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one embodiment, seismic data, such as pressure signals, from hydrophones are stored in disk storage device 531. The system computer 530 may retrieve the appropriate data from the disk storage device 531 to perform program instructions that correspond to the pressure signal gradient computation methods described herein. The program instructions may be written in a computer programming language, such as C++, Java and the like. The program instructions may be stored in a computer-readable memory, such as program disk storage device 533. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 530 presents output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with hydrophones (either directly or via a recording unit, not shown), to receive signals indicative of the reflected seismic energy. These signals, after conventional formatting and other initial processing, are stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for computing a pressure signal gradient, comprising:

recording a plurality of pressure signals at a first receiver and a second receiver, wherein the first receiver and the second receiver are disposed within a cluster;

computing a calibration filter by minimizing a cost function $\phi(k_x, \omega)$ as a function of angular frequency, wherein $$\varphi(k_x, \omega) = -\frac{1}{2\rho\omega}\left(\left(\frac{1}{i\Delta z} + k_z\right)\tilde{P}_1 + \frac{1}{i\Delta z}G(\omega)\tilde{P}_2\right),$$

where $G(\omega)$ represents the calibration filter, $\phi(k_x, \omega)$ represents a cost function, $\rho$ represents the density of water, $\omega$ represents the angular frequency, $\tilde{P}_1$ represents the recorded pressure signals at the first receiver, $\tilde{P}_2$ represents the recorded pressure signals at the second receiver, $\Delta z$ represents a vertical distance separating the first receiver from the second receiver, and $k_z$ represents an absolute value of a vertical wave number; and storing the calibration filter to memory.

2. The method of claim 1, wherein the cost function $\phi(k_x, \omega)$ is minimized in a space-time data window that contains only up-going waves.

3. A method for computing a pressure signal gradient, comprising:

recording a plurality of pressure signals at a first receiver and a second receiver, wherein the first receiver and the second receiver are disposed within a cluster;

computing a calibration filter for removing the difference in distortions between the pressure signals recorded at the first receiver and the pressure signals recorded at the second receiver, wherein the calibration filter is computed by minimizing a cost function $\phi(k_x, \omega)$ as a function of angular frequency, wherein $$\varphi(k_x, \omega) = -\frac{1}{2\rho\omega}\left(\left(\frac{1}{i\Delta z} + k_z\right)\tilde{P}_1 + \frac{1}{i\Delta z}G(\omega)\tilde{P}_2\right),$$

where $G(\omega)$ represents the calibration filter, $\phi(k_x, \omega)$ represents a cost function, $\rho$ represents the density of water, $\omega$ represents the angular frequency, $\tilde{P}_1$ represents the recorded pressure signals at the first receiver, $\tilde{P}_2$ represents the recorded pressure signals at the second receiver, $\Delta z$ represents a vertical distance separating the first receiver from the second receiver, and $k_z$ represents an absolute value of a vertical wave number; and computing the pressure signal gradient between the pressure signals recorded at the first receiver and the pressure signals recorded at the second receiver using the calibration filter; and storing the pressure signal gradient to memory.

4. The method of claim 3, wherein the cost function $\phi(k_x, \omega)$ is minimized in a space-time data window that contains only up-going waves.

5. A method for computing a pressure signal gradient, comprising:

deploying a streamer having one or more receivers, each receiver being coupled to a pressure signal gradient measuring device having a first receiver vertically disposed above a second receiver, the first receiver being separated from the second receiver by a distance ranging from about 1.5 cm to about 15 cm;

recording a plurality of pressure signals at the first receiver and the second receiver;

computing the pressure signal gradient between the pressure signals recorded at the first receiver and the pressure signals recorded at the second receiver;

storing the pressure signal gradient to memory; and wherein computing the pressure signal gradient comprises computing a calibration filter using the recorded pressure signals, wherein computing the calibration filter comprises minimizing a cost function $\phi(k_x, \omega)$ as a function of angular frequency, wherein $$\varphi(k_x, \omega) = -\frac{1}{2\rho\omega}\left(\left(\frac{1}{i\Delta z} + k_z\right)\tilde{P}_1 + \frac{1}{i\Delta z}G(\omega)\tilde{P}_2\right),$$

where $G(\omega)$ represents the calibration filter, $\phi(k_x, \omega)$ represents a cost function, $\rho$ represents the density of water, $\omega$ represents the angular frequency, $\tilde{P}_1$ represents the recorded pressure signals at the first receiver, $\tilde{P}_2$ represents the recorded pressure signals at the second receiver, $\Delta z$ represents a vertical distance separating the first receiver from the second receiver, and $k_z$ represents an absolute value of a vertical wave number.

* * * * *